United States Patent [19]

Boeckman et al.

[11] Patent Number: 4,519,578
[45] Date of Patent: May 28, 1985

[54] HIGH PRESSURE CAM SEAL VALVE

[75] Inventors: Paul A. Boeckman, Glenpool; Dennis L. Young, Tulsa, both of Okla.

[73] Assignee: Dover Corporation, Tulsa, Okla.

[21] Appl. No.: 474,504

[22] Filed: Mar. 11, 1983

[51] Int. Cl.³ .............................................. F16K 25/00
[52] U.S. Cl. .................................. 251/163; 251/188; 251/308
[58] Field of Search ............................... 251/162, 163

[56] References Cited

U.S. PATENT DOCUMENTS

| 3,477,690 | 11/1969 | Murota | 251/163 |
| 3,627,259 | 12/1971 | Williams | 251/163 |
| 3,697,042 | 10/1972 | Killian | 251/163 |
| 3,854,696 | 12/1974 | Keyes | 251/163 |

Primary Examiner—Harold W. Weakley
Attorney, Agent, or Firm—Head, Johnson & Stevenson

[57] ABSTRACT

A valve formed of a body having a flow passageway therethrough defining an annular valve seat, a valve disc member positioned in the flow passageway movable between a closed and open position, the disc having a peripheral sealing surface which engages the valve seat when the valve is closed and a valve stem axially and rotatably received in stem openings in the valve body, the stem extending within the flow passageway, the valve disc being between the stem and the valve seat and boss portions having slots therein extending from the disc rearward surface to either side of the valve stem, each boss portion having aligned upper and lower slots in parallel planes intersecting the plane of the disc sealing surface at an acute angle, and pin members extending from the stem received in the upper and lower slots so that when the pin member is axially displaced the disc is moved to and away from the seat and when it is moved away from the seat, the disc may be rotated without contacting the sealing ring to open the valve allowing fluid flow therethrough. The disc is supported to the stem in such a way that in all positions the plane of the disc sealing surface is parallel the axis of the stem.

3 Claims, 6 Drawing Figures

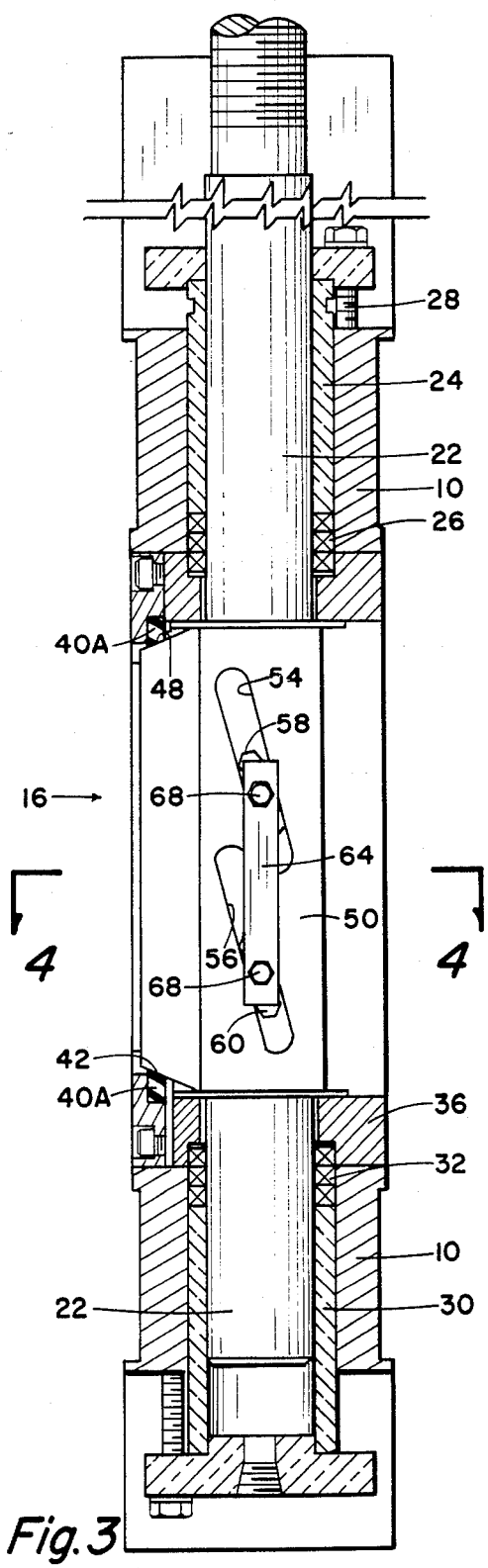
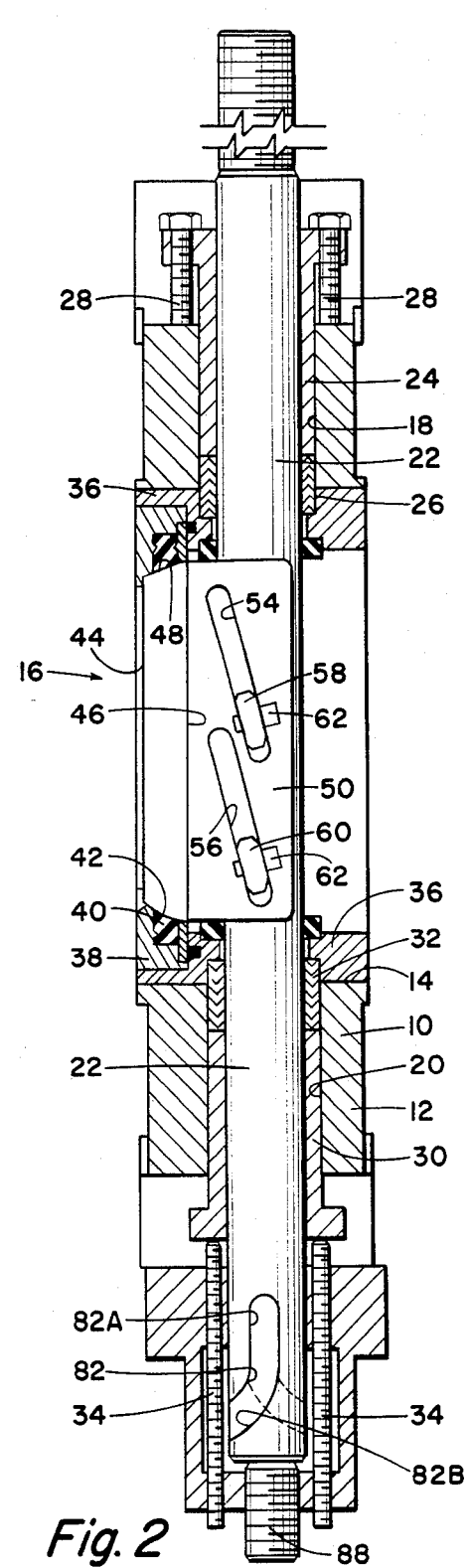
Fig. 3
Fig. 2

HIGH PRESSURE CAM SEAL VALVE

BRIEF SUMMARY OF THE INVENTION

This invention is directed towards a type of butterfly valve which has improvements making it adaptable for use in high temperature, high pressure applications. In U.S. Pat. No. 3,627,259 a unique cam seal butterfly is disclosed in which the butterfly valve disc is moved towards and away from the valve seat; and when moved away from the valve seat, the disc can be rotated to fully open the valve.

In a butterfly valve it is important that the disc be supported securely to the stem so as to prohibit the possibility of movement of the disc relative to the stem by the effect of fluid flow through the valve. When high velocity fluid flows are encountered, any possible movement of the valve disc can result in flutter which can soon damage the valve, resulting in a substantially reduced useful valve life. The present invention is directed towards a means of coupling the valve stem and valve disc in such a way as to allow the disc to be displaced relative to the stem and subsequently to be rotated by the stem, but at the same time in a manner such that the disc is securely supported to the stem to substantially eliminate the possibility of flutter of the valve disc relative to the stem under high flow rates. Stating it another way, the present invention provides an arrangement wherein the plane of the disc sealing surface is supported parallel to the axis of the stem at all times, whether the valve is fully opened, fully closed, or in an intermediate position.

The invention is, therefore, directed towards an improved and more effective high pressure cam seal butterfly valve.

BRIEF DESCRIPTION OF THE SEVERAL VIEWS OF THE DRAWING

FIG. 2 is a cross-sectional view of the valve of FIG. 1.

FIG. 3 is a cross-sectional view as in FIG. 2 but in an arrangement which employs an alternate means of causing the rotation of the valve stem when it is axially displaced and showing a different valve seat arrangement.

DETAILED DESCRIPTION

Figure 1:
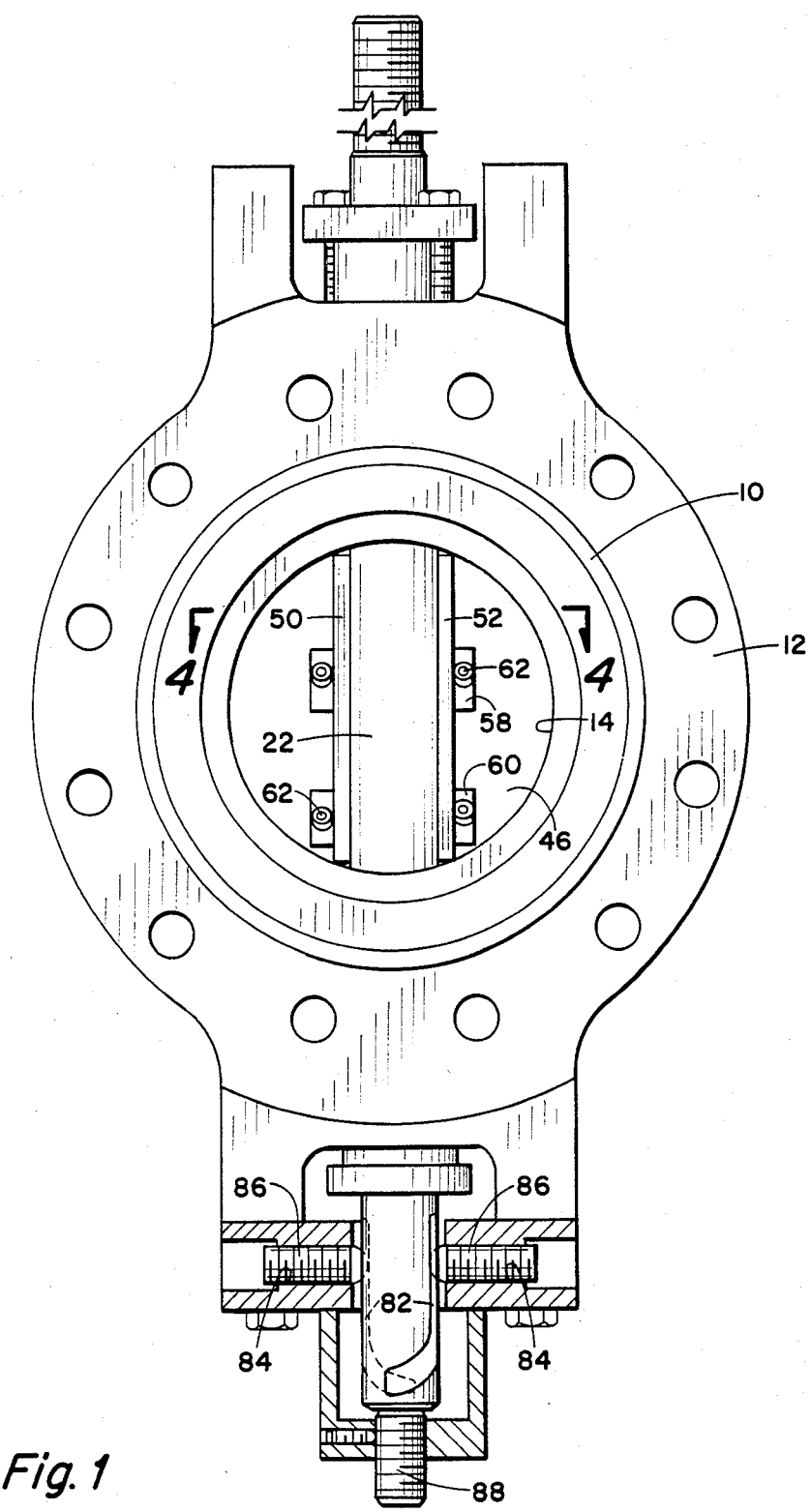
FIG. 1 is a rearward view of a butterfly valve which employs the principles of this invention. The lower portion of the valve is shown in cross-section.

Referring to the drawings and first to FIG. 1, an end view of a valve is shown. The valve includes a body 10 which, in the illustrated arrangement, includes a flange portion 12 integrally formed with the body as a means of mounting the body in various piping arrangements. The body 10 includes an annular flow passageway 14 therethrough. Positioned within the flow passageway 14 is a disc 16. The disc may be rotated so that it blocks the flow passageway 14, or it may be rotated so that it is parallel the axis of the flow passageway 14.

Referring to FIG. 2, a cross-sectional view of the valve of FIG. 1 is shown. The valve body 10 includes an upper stem opening 18 and a lower stem opening 20. Received in the aligned openings 18 and 20 is a stem member 22. The upper stem opening 18 receives a stem bushing 24. Received about the stem is packing 26. By the adjustment of bolts 28 the compression of packing 26 is controlled.

In like manner, the lower stem opening 20 receives a lower stem bushing 30 which compresses packing 32 in response to the position of bolts 34.

Received in the valve passageway 14 is an annular insert 36. A circular seat retainer 38 is received within the insert 36 and captures a circumferential seating element 40 which forms an annular valve seat surface 42.

Positioned within the body flow passageway is the disc member 16 which has a forward surface 44 and a rearward surface 46. Formed on the disc is a circumferential seating surface 48. When the disc seating surface 48 is in secure engagement with the valve seat surface 42 the valve is closed, prohibiting the flow of fluid therethrough. The present invention is directed towards an improved means of moving the disc seating surface 48 to and away from the valve body seating surface 42 and for the subsequent rotation of the disc 16.

Figure 4:
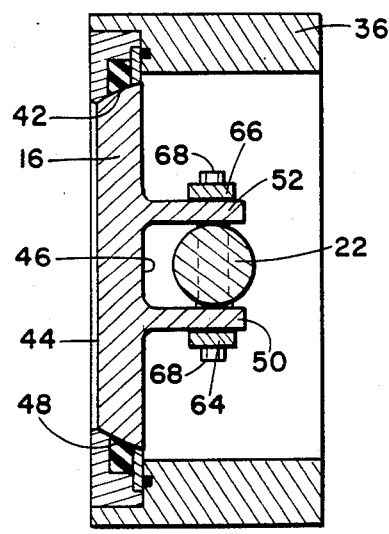
FIG. 4 is a cross-sectional view of a valve taken along the line 4—4 of FIG. 3 showing the valve disc in the closed position.
Figure 5:
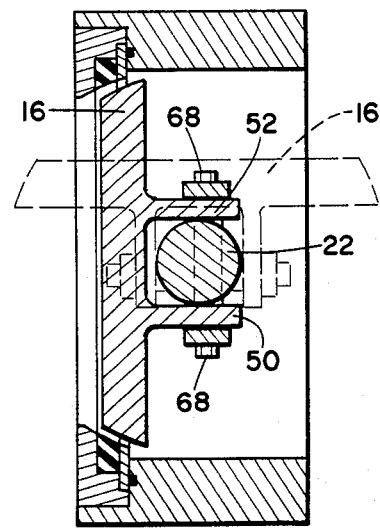
FIG. 5 is a view as in FIG. 4 showing in solid outline the valve disc after it has been moved out of contact with the valve body seat and in dotted outline wherein the disc has been rotated to the fully opened position.

Extending rearwardly from the disc rearward surface 46 is a pair of integral boss portions 50 and 52, best seen in FIGS. 2 and 3 and in the cross-sectional views of FIGS. 4 and 5. Each boss portion has an upper slot 54 and a lower slot 56. FIGS. 2 and 3 show the upper and lower slots 54 and 56 in the first boss portion 50, it being understood that the second boss portion 52 likewise has such upper and lower slots. The upper slots in each of boss portions 50 and 52 are in a common plane; and in like manner, the lower slots 56 in each of boss portions 50 and 52 are in a common plane. The plane of the upper slots is parallel to the plane of the lower slots, and the planes intersect the plane of the disc sealing surface 48 at an acute angle.

Extending through the valve stem 22 is a first or upper pin 58 and a second or lower pin 60. The pins 58 and 60 extend perpendicular to the longitudinal axis of the valve stem and are spaced apart from each other. The pins 58 and 60 are received in the disc boss portion slots 54 and 56. While the pins 58 and 60 may be circular in cross-section, the preferred arrangement is illustrated wherein the pins are generally rectangular with rounded edges with the width of the pin being slightly less than the width of slots 54 and 56.

As shown in FIGS. 4 and 5, the spacing between the boss portions 50 and 52 is slightly greater than the diameter of valve stem 22. To retain the pins 58 and 60 and the disc boss portions 50 and 52 in proper relationship, bolts 62 may be inserted through the ends of the pins extending beyond the boss portions in the arrangement of FIG. 2. FIG. 3 shows an alternate embodiment in which the length of the pins is only slightly greater than the outside widths of the boss portions, and link members 64 and 66 (see also FIGS. 4 and 5) connect the outer end of the pins. Bolts 68 extend through the links and into the end of the pins.

The valve disc is moved into and out of sealing engagement with the valve seat 42 by the longitudinal positioning of the valve stem 22. As shown in FIGS. 2 and 3, the valve stem is in its downward position. This causes the pins 58 and 60, acting in slots 54 and 56, to move the valve disc 16 in the direction to the left into positive sealed engagement with the valve seat 42. To relieve the positive engagement of the valve disc seating surface 48 with the valve sealing surface 42, the valve stem is moved in an upward direction, as illustrated in FIG. 5. Upward stem movement, due to the inclination of the slots 54 and 56, causes the disc 16 to be displaced rearwardly. After the stem has been moved upwardly to displace disc 16 and relieve contact between the disc sealing surface 48 and the valve seating surface 42, further upward movement of the stem 22 causes the disc 16 to be rotated by the engagement of bolts 86 with cam grooves 82. Rotation of the valve stem 90° moves disc 16 to its fully open position as shown in dotted outline in FIG. 5.

Figure 6:
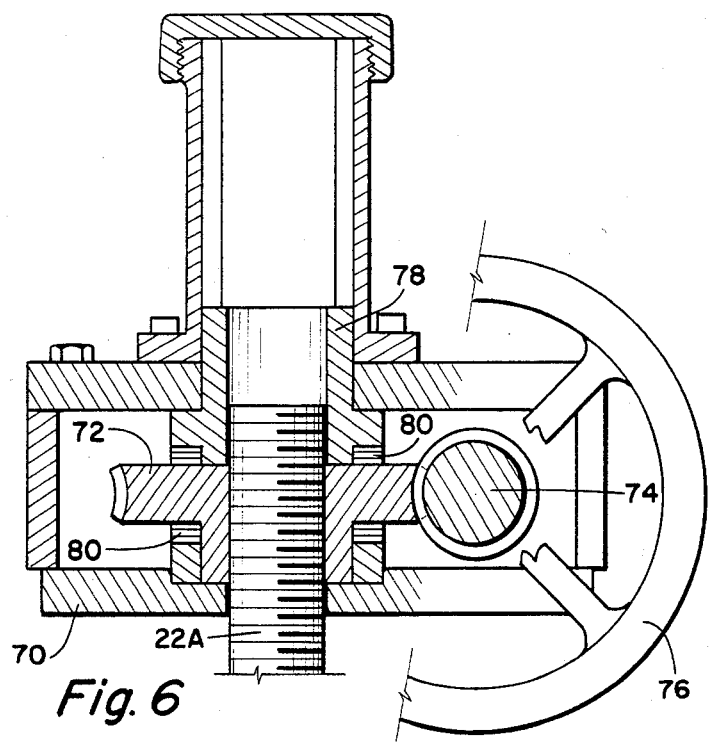
FIG. 6 is a cross-sectional view of one embodiment of a mechanism for upwardly displacing the valve stem.

An apparatus for causing the axial displacement of stem 22 for the sealing and unsealing of the disc and for rotation of the disc between open and closed position which can be successfully employed with the invention is illustrated in U.S. Pat. No. 3,627,259. Another mechanism which can be employed in the invention is illustrated in FIG. 6. The upper end of the stem 22 is threaded at 22A. An actuator housing 70 receives the upper threaded portion 22A of the stem, and received on the stem within the housing is a gear member 72 which is internally threaded. A worm gear 74 engages the circumferential teeth on the periphery of gear 72. A shaft of the worm gear extends externally of housing 70 and can be manually rotated by wheel 76. A bushing 78 and thrust bearings 80 maintain the gear 72 in a rotatable, but non-axial displaceable position. By rotation of handwheel 76, gear 72 is rotated which causes the stem 22 to rise up and down within the valve body.

The lower end of stem 22, as shown in FIG. 2, has opposed cam grooves 82 therein. Each of the grooves 82 has an upper linear portion 82A and a lower curved portion 82B. The linear portion 82A of the groove is in the plane of the stem longitudinal axis.

As shown in FIG. 1, the lower portion of the valve body 12 includes opposed threaded openings 84, each of which receives an externally threaded bolt 86, the inner ends of which engage the opposed grooves 82. Thus when the valve stem 22 is raised, such as by rotating wheel 76, the bolts 86 received in the cam grooves 82 control the rotational position of the stem relative to the body. The initial portion of the vertical rise of the stem occurs while the ends of bolts 84 are within the linear portions 82A of the grooves, causing the disc 16 to be displaced away from the valve seat, moving the disc from the position shown in FIG. 4 to that in FIG. 5. Further axial upward displacement of the stem moves the curved portions 82B of the grooves into engagement with the bolts 86 causing the stem to rotate to a maximum of 90°, that is, to the position as shown in dotted outline in FIG. 5 wherein the disc is likewise rotated 90°, moving the valve to the fully opened position. In such position fluid can flow freely through the valve to either side of the disc. To adjust the downward position of the stem, a stop bolt 88 is employed. By the adjustment of stop bolt 88, the amount of pressure which is applied by the maximum downward displacement of stem 22 to force the disc into engagement with the valve sealing surface is controlled.

The cross-sectional arrangement of the valve of FIGS. 2 and 3 are substantially the same in principle, although differing somewhat in detail. The arrangement of FIG. 3 does not include the employment of grooves formed in the lower end of the valve stem but instead, employs an external actuating device affixed to the upper end of the valve body (not shown) such as that specifically and completely described in the prior issued U.S. Pat. No. 3,627,259. Other than the means of causing axial displacement and rotation of the valve stem, the valves of FIGS. 2 and 3 function in the same manner. The arrangement of FIG. 3 employs a somewhat different means of retaining the valve seating element 40A, but the principle of operation remains the same. The comparision between the embodiments of FIGS. 2 and 3 illustrates the fact that the invention may be practiced utilizing a variety of different body and valve seat construction and a variety of different actuating mechanisms, all in keeping with the principles of the invention.

As previously stated, the present invention is directed towards an improvement in the concept as illustrated in the previously issued U.S. Pat. No. 3,627,259. The invention provides a means of more securely and effectively supporting a butterfly type valve disc to a stem arranged for both lateral and rotational positioning of the disc relative to the valve seat by movement of a valve stem. It can be seen that when the valve is in the fully closed and locked position the disc is forced into contact with the valve body seat, and no possibility of movement between the disc, the stem, and the valve body can occur. However, when the valve is in the opened position, such as shown in dotted outline in FIG. 5, a high rate of fluid flow past the disc can be the source of substantial forces tending to cause the disc to move or flutter relative to the valve stem. By the employment of spaced apart means of supporting the disc to the stem, the possibility of free play or movement of the disc is greatly minimized. The value of this invention thus provides a significant advancement of the state of the art of high pressure cam seal butterfly valves.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A valve comprising:
    a body having a flow passageway therethrough defined in part by an annular valve seat and having upper and lower stem openings therein;
    a circular valve disc member positioned in said flow passageway and movable between a closed and an opened position, the valve disc having a forward surface having a peripheral sealing surface and having a rearward surface having spaced apart rearwardly extending paralleled boss portions, each boss portion being substantially the full length of a cord of the disc circular rearward surface, each boss portion having an upper and a lower slot therein, the upper slots being in a first common plane and the lower slots being in a second common plane, the first and second planes being parallel to each other and intersecting the plane of the disc sealing surface at an acute angle;
    a valve stem axially positionable and rotatably positioned in said stem openings in said body, the stem being received between said disc member boss portions, said disc being thereby securely supported to the stem relative to rotational movement of said disc about its circular axis, the stem having a slot in the cylindrical surface, the slot being displaced from the plane of the stem axis;

a first and a second spaced apart paralleled pin member extending to either side of said stem and received within said disc member boss portions first and second slots respectively providing four spaced apart contact areas between said pins and said disc boss portions, the pins securely supporting said disc to said stem against displacement of the plane of said disc away from a parallel relationship with said stem;

a drive gear having an internally threaded axial opening therein, said stem member having an externally threaded portion external of said body threadably receiving said drive gear;

housing means secured to said valve body and rotatably receiving said stem member, said housing means rotatably and nonaxially displaceably supporting said drive gear;

means of rotating said drive gear; and a guide pin extending slidably into said slot in said stem which causes said stem to rotate as it is axially displaced.

2. A valve according to claim 1 wherein said pin members are of generally rectangular cross-sectional configuration and of thickness slightly less than the width of said slots in said boss portions.

3. A valve according to claim 2 wherein said boss portions are spaced apart slightly greater than the diameter of said stem, and wherein said pins are of length greater than the outer spacing of said boss members and including retainer means secured to said pins exteriorally of said boss portions.

* * * * *